United States Patent [19]

Wilkomirsky

[11] Patent Number: 5,939,038
[45] Date of Patent: Aug. 17, 1999

[54] PROCESS FOR REMOVING BORON FROM BRINES

[75] Inventor: Igor Wilkomirsky, Concepcion, Chile

[73] Assignee: Sociedad Minera Salar de Atacama S.A., Santiago, Chile

[21] Appl. No.: 08/803,234

[22] Filed: Feb. 20, 1997

[30] Foreign Application Priority Data

Feb. 20, 1996 [CL] Chile ................................ 243-96

[51] Int. Cl.$^6$ .................................................. C01B 35/00
[52] U.S. Cl. ............................................ 423/276; 423/157
[58] Field of Search ............................ 423/157, 276

[56] References Cited

U.S. PATENT DOCUMENTS

| | | |
|---|---|---|
| 2,969,275 | 1/1961 | Garrett . |
| 3,111,383 | 11/1963 | Garrett et al. . |
| 3,424,563 | 1/1969 | Grinstead ................................ 423/157 |
| 3,493,349 | 2/1970 | Schiappa et al. . |
| 3,855,392 | 12/1974 | Folkestad et al. ....................... 423/157 |

*Primary Examiner*—Wayne Langel
*Attorney, Agent, or Firm*—Birch, Stewart, Kolasch & Birch, LLP

[57] ABSTRACT

Boron is effectively removed from brine, including lithium-containing brines, by acidifying the brine to a pH of 0.1 to 6.0 and then contacting the brine with an extraction medium comprising at least a diol having 6 to 20 carbon atoms in an aromatic solvent. The extraction medium may also contain high aliphatic alcohols and/or a phase modifier. The boron can be stripped from the boron rich extractant medium by a re-extraction stage utilizing an aqueous alkaline solution.

23 Claims, No Drawings

PROCESS FOR REMOVING BORON FROM BRINES

BACKGROUND OF THE INVENTION

1. Field of the Invention

The present invention relates to a process for removing boron from brines by the use of an organic extraction medium that contains at least one diol having 6 to 20 carbon atoms.

2. Description of the Prior Art

An important amount of the lithium currently produced in the world comes from natural brines produced in salt mines such as the Atacama Salt Mine (Salar de Atacama). These brines generally have a lithium content of 0.05 to 0.2%. The brines also contain large amounts of sodium chloride, potassium, and magnesium as well as sulfates and other minor elements, including boron. Boron is generally contained in these brines as magnesium borate, calcium borate, or lithium borate.

Even though boron is an element of wide industrial application, it has negative effects on the production of lithium and aluminum. For example, one of the predominant current uses of lithium carbonate is in the electrolysis process for obtaining aluminum by means of fused salts. The boron impurities in the lithium carbonate accumulate in the cell until finally the cell is short circuited.

The same occurs in the production of metallic lithium by electrolysis of fused salts. In this case, the boron present in purified lithium chloride, which is obtained from lithium carbonate, is also accumulated in the electrolyte of LiCl-KCl, producing a low efficiency of current and, as a consequence, a considerable decrease in the productivity of the cells.

Because of these problems, it is necessary to remove the boron before the lithium carbonate production process. If boron is not eliminated before the precipitation of lithium carbonate, the boron precipitates together with the lithium carbonate as lithium borate or tetraborate, thereby causing the above-mentioned results.

Generally, the natural brines with lithium and boron content of 0.01 to 0.5% and 0.05 to 0.1%, respectively, are concentrated by means of solar evaporation, thereby sequentially precipitating a series of salts of different composition, depending on the initial composition of the brine. At the end of the evaporation cycle, the brines may contain 4 to 6% lithium and 0.5 to 1.5% boron, which will then require the elimination of the boron for the reasons stated above.

The methods normally utilized for removing boron from such brines comprises precipitation of the boron as boric acid or extraction of the boron with solvents. In the latter methods, the extractants generally utilized are high aliphatic alcohols, such as isooctyl alcohol, or the like.

The literature cites numerous patents that teach the application of organic extractants for boron, be it from natural brines or from industrial brines.

Chilean Patent No. 37,337 by P. M. Brown and D. A. Boryta (assigned to Cyprus Foote Mineral Co.) utilizes fatty alcohols with 6 to 15 carbon atoms in their structure, dissolved in kerosene. Specifically, isooctyl alcohol with a pH of 1 to 2 is used. This technology does not include a method for re-extracting the boron from the charged (boron rich) organic medium.

U.S. Pat. No. 3,855,392 of Dec. 17, 1974, by Falkestad, Loiten, Mejdell, and Torvund, shows a process similar to the one cited previously, wherein high aliphatic alcohol having between 7 and 12 carbon atoms is dissolved in petroleum ether at a pH of 2 to 4. Extraction is effected at a pH of 8 to 10 in water. Mention is made of isooctyl alcohol as the high aliphatic alcohol best suited for the purpose. This particular process is for removing the boron from magnesium brines suitable for producing electrolytic magnesium.

U.S. Pat. No. 4,980,136 of Dec. 25, 1990, by P. Brown and S. Beckerman, describes a process similar to the two mentioned above, which proposes to also utilize high aliphatic alcohols with 6 to 16 carbon atoms in their structure dissolved in Kerosene with a pH of 1 to 2. In this patent document, however, the manner and the reaction used for re-extraction, which are critical for the economic effectiveness of the process, are not specified.

In U.S. Pat. No. 3,111,383 of Nov. 19, 1963, by D. Garrett, it is proposed to utilize polyols as agents for boron extraction, such as phenyl glycols, glycerol, methyl phenol, and naphthols, applied to liquors and diluted solutions of boron in an alkali medium. This method is not applicable to natural brines.

British Patent No. 1,354,444 of May 30, 1974, by Norek Hydro, also proposes an aliphatic alcohol with 7 to 12 carbon atoms in its structure as an extractant agent. 2-ethyl hexanol dissolved in petroleum ether is used, particularly with a pH of 2 to 4, effecting re-extraction in an aqueous medium with a pH of 8 to 10. This technology is specifically for extracting boron from brines or from solutions with a relatively high content of magnesium, in the absence of lithium.

In U.S. Pat. No. 3,839,222 of Oct. 1, 1974, by E. Grannen, it is proposed to utilize isoamyl alcohol mixed with salicylic acid as an extractant, dissolved in an organic solvent such as a light fraction of petroleum. The results shown, however, do not indicate a very efficient extraction of boron.

In U.S. Pat. No. 3,424,563 of the year 1969, by Grinstead, it is proposed to utilize diols, organic compounds possessing two OH groups in their molecule as opposed to alcohols which have only one OH group, dissolved in an alkali-ammonia salt. The diols recommended are catecols containing 7 to 20 atoms. The alkali-ammonia salt has 12 to 30 atoms in its structure. The re-extraction is carried out in an acidic medium at 20 to 60° C. This type of extractant is very expensive, has a relatively low stability, and is not suitable as an industrial agent.

U.S. Pat. No. 2,969,225 of Jan. 24, 1961, by D. Garret, shows a process wherein the boron is removed from natural brines by utilizing aliphatic diols in a triol solvent. The triols have 6 to 16 carbon atoms in their molecules. Importantly, the solvent used is not specified. Re-extraction is effected in an acidic aqueous medium such as 2 normal of sulfuric acid. These conditions appear excessively energetic for the extractant, since they can oxidize the diol, thereby degrading it.

U.S. Pat. No. 3,493,349 of Feb. 3, 1970, by Schiappa, Place, Hudson and Grinstead, shows the utilization of diols for the extraction of boron from natural or synthetic brines containing magnesium chloride. Among the extracting diols proposed are water-insoluble b-aliphatic diols with 6 to 20 carbon atoms in their molecule, at a pH of 1.6 to 5.0. It is mentioned that the stripping must be performed at a basic pH, without specifying the conditions or reactants required.

SUMMARY OF THE INVENTION

It is an object of the invention to provide an efficient process for extracting boron from brines.

It is another object of the invention to provide a process re-extracting boron and regenerating the extraction medium.

These and other objects of the invention are achieved by a process which comprises:

(a) acidifying a diluted boron-containing brine solution, having a weight ratio of dilution water to brine of 10/1, to a pH of from 0.1 to 6.0; and (b) contacting, in one or more stages, said acidified brine solution with an organic medium which comprises an aromatic solvent having dissolved therein at least one extractant selected from the group consisting of diols having 6 to 20 carbon atoms, to thereby extract boron from said brine and form a boron-rich organic medium and a substantially boron-free brine solution.

Optionally, the process further comprises:

(c) contacting, in one or more stages, said boron-rich organic medium with an aqueous alkaline solution to re-extract said boron from said boron-rich organic medium and thereby regenerate said organic medium and form a boron-containing aqueous solution.

This invention, notwithstanding the fact that a diol is also utilized for boron extraction, can be utilized for brines from natural salt mines such as the ones from the Atacama Salt Mine (Salar de Atacama), which may contain between 5,000 and 15,000 parts per million of boron (0.5 to 1.5%-wt.).

The diol extractant used in the present invention is dissolved in a solvent of the aromatic type and can also be applied in combination with a phase modifier. Mixtures of one or more extractants of the diol or high aliphatic alcohol type can also be employed, so long as at least one diol is present.

DETAILED DESCRIPTION OF THE INVENTION

As used in this application, the term "boron" refers to elemental boron as well as boron-containing compounds, such as borates and hydrates.

"Brines" refers to natural and synthetic brines as well as to concentrated forms thereof. The brines typically used in the present invention contain lithium in addition to boron. Natural brines such as the ones from the Atacama Salt Mine (Salar de Atacama), may be concentrated before being used in the present invention by solar evaporation until a concentrated lithium-rich brine is obtained. Such concentrated brines generally have the following composition (% by weight):

| | | |
|---|---|---|
| Boron | 0.5–1.5% | |
| Magnesium | 1.0–2.5% | |
| Lithium | 5–7% | |
| Chlorine | 30–38% | |
| Sodium | 0.01–0.15% | |
| Calcium | 0.02–0.05% | |
| Sulfate | 0.01–0.03% | |
| Potassium | 0.01–0.02% | |
| Water | 50–60% | (combined as hydrates) |

The process of the invention begins by acidifying such brine to a pH 0.1 to 6.0, measured by diluting such acidified brine in water to a weight ratio 1/10 of brine/water. Appropriate acids for carrying out the acidification include hydrochloric acid, sulfuric acid, and the like.

The next step of the process consists of one or more stages of extraction with solvents. The extractant utilized in this stage of extraction consists, at least, of one diol with 6 to 20 carbon atoms in its structure. This diol can be used alone or in combination with a phase modifier. Further, this diol can be combined with a high aliphatic alcohol, with or without a phase modifier. In any case, the extractant (or the mixture of extractants) is dissolved in an organic solvent of the aromatic type. This mixture is referred to as the "organic medium." The acidified brine is contacted in one or more stages, preferably 3 to 6 stages, in an organic/solvent ratio of 1/10 to 10/1 in weight, preferably 1/1 to 5/1, for a contact time of 1 to 60 minutes preferably 5 to 30 minutes and a temperature of 0° C. to 80° C., preferably 10 to 30° C. As a result, there is obtained a brine which is virtually free of boron and an organic medium rich with boron.

A preferred diol to be utilized in the process is 2-ethyl-1,3-hexane diol. When the diol is utilized in combination with one or more high aliphatic alcohols, the ratio of any of these extractants with respect to the sum of the other extractants present in the mixture can be from 1/2 to 1/20 in weight, preferably 1/5 to 1/10. The high aliphatic alcohols used in the present invention contain at least 6 carbon atoms, more preferably 8–18 carbon atoms. A preferred high aliphatic alcohol for mixing with the diol is isooctyl alcohol.

The phase modifier useful in the present invention serves to improve the solubility of the diol. A preferred phase modifier in the extraction stage is tributyl phosphate.

In the case where a phase modifier is used, the weight ratio between the extractant (or the mixture of the extractants) and the modifier is 1/10 to 10/1.

The aromatic solvent to be used may be Escaid 100, the commercial name of one of the aromatic solvents with a high content of aromatic solvents existing in the market. In all these cases, be it that the diol is utilized alone or in any proportion of the same with aliphatic alcohol and phase modifier, the solvent of these is an organic solvent of the aromatic type, and must have a high proportion of cyclic chains (aromatics) in its structure in order to render more soluble the diol used as extractant.

The preferred utilization of tributyl phosphate as phase modifier improves the solubility of the diol 2-ethyl-1,2-hexane diol in the aromatic solvent and, at the same time, has a synergetic effect on the extractant, improving its selectivity and, under certain conditions, improving its charging or loading capacity.

The phase modifier also serves to improve the solubility of the diol in the organic solvent and also improves the phase separation during the extraction stage. Other modifiers that can be used include isodecanol alcohol, which gives similar results. These and other phase modifiers are widely used in the solvent extraction practice.

On the other hand, the use of a combination of a diol such as 2-ethyl-1,3-hexane diol with a high aliphatic alcohol such as isooctyl alcohol, has the advantage of improving the mutual solubility of both in the aromatic solvent, and of also having a synergistic effect. This synergetic effect is further enhanced if a phase modifier such as tributyl phosphate is present.

In case another phase forms in the extraction stage, known generally as gel, precipitated or "crate," the same can be eliminated in one or more separate additional extraction stages, referred to collectively as a "first washing." In each of these stages, the boron rich organic medium is contacted with an acidic aqueous solution with a pH of 0.5 to 7, utilizing an acid such a hydrochloric or sulfuric acid, or the like, for a contact time of 5 to 30 minutes, preferably 5 to 15 minutes, and at temperatures between 0° C. and 80° C., preferably 10° C. to 30° C. If the diol utilized in the extraction consists of 2-ethyl-1,3-hexane diol, then the aqueous solution of the first washing stage preferably includes sodium chloride in an amount between 50 and 380 g/l, preferably between 80 and 250 g/l. This avoids an excessive dilution of the organic medium in the aqueous solution. The initial organic/aqueous ratio in the stage of first washing should be maintained at a ratio of 1/10 to 10/1, preferably 1/5 to 5/1.

The boron-rich organic medium, be it the one obtained directly in the extraction stage or the one obtained after the optional first washing, is subjected to one or more re-extraction stages wherein the boron is stripped. The boron rich organic medium is mixed with an aqueous alkaline solution having a pH of 7 to 14. The alkaline solution may contain sodium hydroxide, potassium hydroxide, sodium carbonate (soda ash), or another similar agent. The organic/aqueous ratio in the initial solution should be 1/10 to 10/1. If the diol utilized in the extraction is 2-ethyl-1,3-hexane diol, then the aqueous solution utilized in this stripping stage preferably contains sodium chloride in an amount of from 50 to 380 g/l, preferably 80 to 250 g/l. The sodium chloride dissolved in the re-extraction aqueous solution minimizes the dilution of both the 2-ethyl-1,3-hexane diol and the high aliphatic alcohol, especially if the later is isooctyl alcohol since it exhibits a certain solubility in water. The temperature for re-extraction or stripping is between 0° C. and 80° C., preferably between 10° C. and 30° C., and the times may vary between 1 and 60 minutes, preferably 5 to 20 minutes.

If, in the extraction stage, the organic medium has co-extracted from the brine other elements such as lithium or magnesium, it is also possible to re-extract these elements after the boron stripping stage by means of one or more stripping stages, referred to collectively as the "second washing." The organic medium is contacted with an aqueous acid solution comprising as hydrochloric or sulfuric acid, or the like, during a time of contact of 5 to 30 minutes, preferably 5 to 15 minutes, and at temperatures between 0° C. and 80° C., preferably 10° C. to 30° C. If the diol utilized in the extraction is 2-ethyl-1,3-hexane diol, then the aqueous solution utilized in this second washing stage preferably includes sodium chloride in an amount of from 50 to 380 g/l, preferably 80 to 250 g/l, for avoiding excessive dilution of the organic medium in the aqueous solution. The organic/aqueous initial ratio in the second washing stage should be maintained at a ratio 1/10 to 10/1, preferably 1/5 to 5/1.

Utilizing these combinations of extractants, it is possible to extract from 70 to 99% of the boron contained in brines such as the ones described above.

The present application claims the benefit of priority under 35 USC § 119 from Chilean patent application 243-96, filed Feb. 20, 1996, the entire contents of which are hereby incorporated by reference.

EXAMPLES

The following is an example of an application of the invention.

With a natural brine from the Atacama Salt Mine (Salar de Atacama), the following composition was arrived at after successive crystallization of salts:

| Boron | 0.8% | |
|---|---|---|
| Lithium | 5.8% | |
| Chlorine | 35.8% | |
| Magnesium | 1.75% | |
| Sodium | 0.07% | |
| Calcium | 0.04% | |
| Potassium | 0.02% | |
| Water | 54.1% | (as hydrates) |

The brine was subjected to an acidification process utilizing hydrochloric acid until a pH of 3.5 was obtained, measured by diluting the acidified brine with water in a weight ratio brine/water of 1/10.

The extractant utilized in the boron extraction stage was a mixture of 20% 2-ethyl-1,3-hexane diol dissolved in 80% by weight of commercial Escaid 100. The organic/aqueous ratio was 4/1 and the retention time was 15 minutes in each extraction stage, carrying out a total of four extraction stages.

The re-extraction or stripping was carried out in a solution of alkali water with 0.5 mol per liter of sodium hydroxide and 250 g/l of sodium chloride in five re-extraction stages, with a retention time in each stage of 10 minutes, and utilizing an organic/aqueous ratio of 2/1.

The brine resulting from the extraction stage contained 6 ppm of boron, while the discharged organic medium after the re-extraction stage contained 13 ppm of boron.

The invention having been thus described, it will be obvious that the same may be varied in many ways. Such variations are not to be regarded as a departure from the spirit and scope of this invention, and all such modifications as would be obvious to one skilled in the art are intended to be included within the scope of the following claims.

We claim:

1. A process for removing boron from brine, which comprises:
   (a) acidifying a diluted boron-containing brine solution, having a weight ratio of dilution water to brine of 10/1, to a pH of from 0.1 to 6.0; measured by diluting the acidified brine in water in a weight ratio of brine/water of 1/10, and
   (b) contacting, in one or more stages, said acidified brine solution with an organic medium which comprises (1) an aromatic solvent having dissolved therein at least one extractant selected from the group consisting of diols having 6 to 20 carbon atoms, and (2) an extractant selected from the group consisting of high aliphatic alcohols having at least 6 carbon atoms, to thereby extract boron from said brine and form a boron-rich organic medium and a substantially boron-free brine solution.

2. The process according to claim 1, wherein said extractant and aromatic solvent are contained in said organic medium in a ratio of from 1/10 to 1/1.

3. The process according to claim 1, wherein in each of said contacting stages (b), said organic medium and brine solution are contacted for a duration of 1 to 60 minutes, in at a weight ratio of organic medium/brine solution of from 1/10 to 10/1, at a temperature of from 0° C. to 80° C.

4. The process according to claim 1, wherein said alcohol is isooctyl alcohol.

5. The process according to claim 1, wherein said organic medium further comprises a phase modifier.

6. The process according to claim 5, wherein said phase modifier is tributyl phosphate.

7. The process according to claim 5, wherein the weight ratio of the modifier to the total amount of extractant is within the range of from 1/10 to 10/1.

8. The process according to claim 1, wherein said diol is 2-ethyl-1,3-hexane diol.

9. The process according to claim 1, which further comprises:
   (c) contacting, in one or more stages, said boron-rich organic medium with an aqueous alkaline solution to re-extract said boron from said boron-rich organic medium and thereby regenerate said organic medium and form a boron-containing aqueous solution.

10. The process according to claim 9, wherein said aqueous alkaline solution of step (c) comprises sodium hydroxide.

11. The process according to claim 9, wherein said aqueous alkaline solution of step (c) comprises potassium hydroxide.

12. The process according to claim 9, wherein said aqueous alkaline solution of step (c) comprises calcium carbonate.

13. The process according to claim 9, which further comprises, prior to said contacting step (c), contacting said boron-rich organic medium with an acidic aqueous solution having a pH of from 0.5 to 7 for a duration of from 5 to 30 minutes at a temperature of from 0° C. to 80° C., to thereby wash said boron-rich organic medium.

14. The process according to claim 9, which further comprises, subsequent to said contacting step (c), contacting said regenerated organic medium with an acidic aqueous solution having a pH of from 0.5 to 7 for a duration of from 5 to 30 minutes at a temperature of from 0° C. to 80° C., to thereby wash said regenerated organic medium.

15. The process according to claim 13, wherein said diol extractant is 2-ethyl-1,3-hexane diol and said acidic aqueous solution comprises 50 to 380 g/l of sodium chloride.

16. The process according to claim 14, wherein said diol extractant is 2-ethyl-1,3-hexane diol and said acidic aqueous solution comprises 50 to 380 g/l of sodium chloride.

17. The process according to claim 9, wherein said aqueous alkaline solution to re-extract said boron comprises 50 to 380 g/l of sodium chloride.

18. The process according to claim 1, which further comprises:
   (c) contacting, in one or more stages, said boron-rich organic medium with an aqueous alkaline solution to re-extract said boron-rich organic medium and thereby regenerate said organic medium and form a boron-containing aqueous solution wherein said aqueous solution comprises a hydroxide and sodium chloride.

19. A process for removing boron from brine, which comprises:
   (a) acidifying a diluted boron-containing brine solution, having a weight ratio of dilution water to brine of 10/1, to a pH of from 0.1 to 6.0; measured by diluting the acidified brine in water in a weight ratio of brine/water of 1/10, and
   (b) contacting, in one or more stages, said acidified brine solution with an organic medium which comprises (1) an aromatic solvent having dissolved therein at least one extractant selected from the group consisting of diols having 6 to 20 carbon atoms, (2) an extractant selected from the group consisting of high aliphatic alcohols having at least 6 carbon atoms, and (3) a phase modifier, to thereby extract boron from said brine and form a boron-rich organic medium and a substantially boron-free brine solution.

20. The process according to claim 19, wherein said diol is 2-ethyl-1,3-hexane diol.

21. The process according to claim 19, wherein said alcohol is isooctyl alcohol.

22. The process according to claim 19, wherein said phase modifier is tributyl phosphate.

23. A process for removing boron from brine, which comprises:
   (a) acidifying a diluted boron-containing brine solution, having a weight ratio of dilution water to brine of 10/1, to a pH of from 0.1 to 6.0; measured by diluting the acidified brine in water in a weight ratio of brine/water of 1/10, and
   (b) contacting, in one or more stages, said acidified brine solution with an organic medium which comprises (1) an aromatic solvent having dissolved therein 2-ethyl-1,3-hexane diol and (2) isooctyl alcohol, to thereby extract boron from said brine and form a boron-rich organic medium and a substantially boron-free brine solution.

* * * * *